United States Patent [19]

Hungerink et al.

[11] Patent Number: 5,054,805
[45] Date of Patent: Oct. 8, 1991

[54] TRAILER LANDING GEAR CUSHION FOOT

[75] Inventors: Gerald W. Hungerink, Holland; John P. Heeb, West Olive, both of Mich.

[73] Assignee: Holland Hitch Company, Holland, Mich.

[21] Appl. No.: 441,710

[22] Filed: Nov. 27, 1989

[51] Int. Cl.$^5$ .............................................. B60D 1/66
[52] U.S. Cl. .............................. 280/475; 280/763.1; 254/419; 254/DIG. 1; 248/352; 212/189
[58] Field of Search ................... 280/475, 763.1, 765.1, 280/766.1; 254/419, DIG. 1; 248/188.8, 188.9, 352; 212/189; 403/157, 158, 79

[56] References Cited

U.S. PATENT DOCUMENTS

| | | | |
|---|---|---|---|
| 2,316,436 | 4/1943 | Kalter | 403/79 |
| 3,219,362 | 11/1965 | Epstein | 280/150.5 |
| 3,666,290 | 5/1972 | Dalton et al. | 280/150.5 |
| 3,751,067 | 8/1973 | Claflin et al. | 280/763.1 |
| 4,462,612 | 7/1984 | Dreyer et al. | 280/763.1 |
| 4,634,144 | 1/1987 | Ringe | 280/763.1 |
| 4,824,136 | 4/1989 | Baxter | 280/475 |

FOREIGN PATENT DOCUMENTS 2204543 11/1988 United Kingdom ................ 280/475

OTHER PUBLICATIONS

Olympix model illustrative material Mark V model drawings & literature.

Primary Examiner—Kenneth R. Rice
Assistant Examiner—Mitchell Bompey
Attorney, Agent, or Firm—Price, Heneveld, Cooper, DeWitt and Litton

[57] ABSTRACT

A cushioned landing gear foot is attached to the landing gear leg by a tubular suspension axle within a housing abutment member on the lower end of the leg, and which abutment engages a resilient pad in a pocket on the foot when under compression load. The abutment member has a rectangular cross section including a flat bottom surface for abutting the pad. The clearance between this flat surface (in elevated condition) and the resilient pad is less than the potential vertical movement of the hollow suspension axle in a pair of slots into which it extends. The pad retaining pocket includes a pair of fore-and-aft inverted L-shaped retaining walls allowing approximately 20 degree fore-and-aft articulation of the foot on the leg, and approximately five degree side-to-side articulation. When the leg and foot are put under load, the pad will be deformed until a predetermined maximum force is applied to it, and then the axle will bear all load exceeding this predetermined amount.

38 Claims, 2 Drawing Sheets

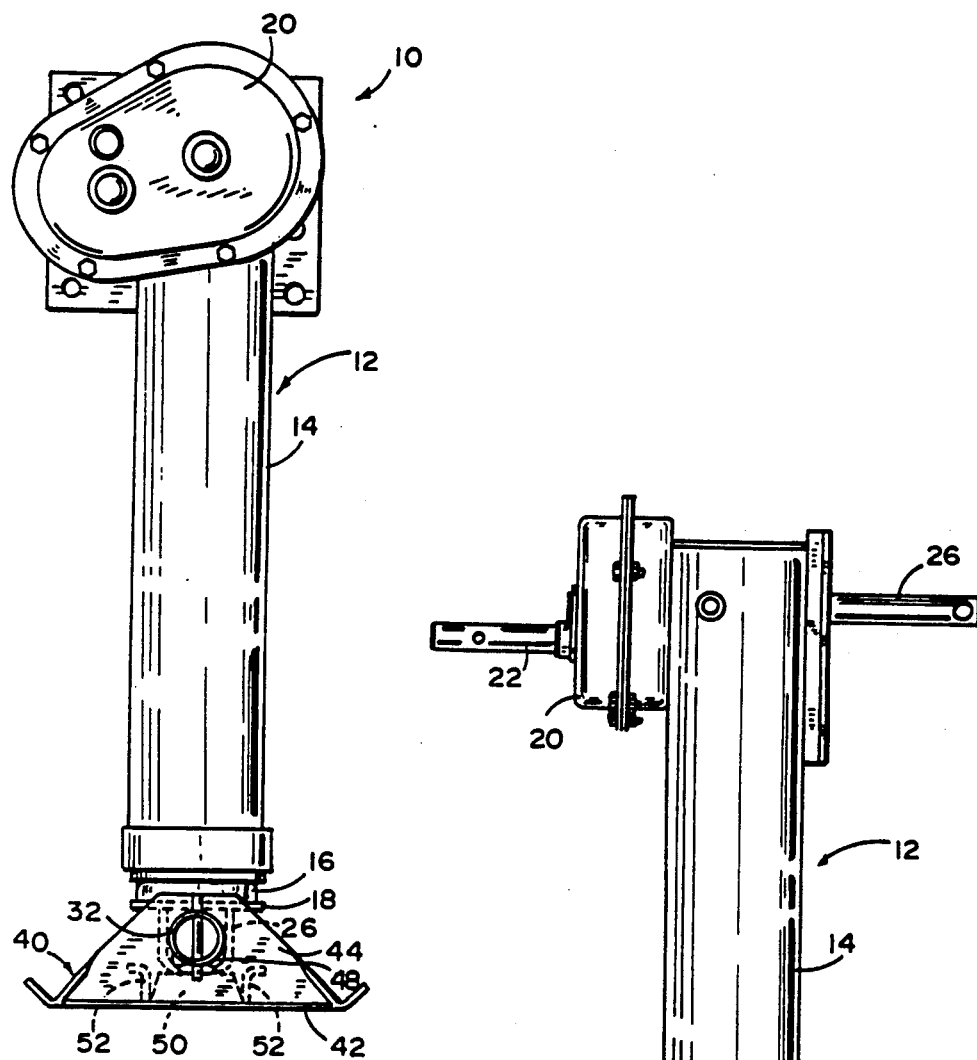
FIG. 1
FIG. 2
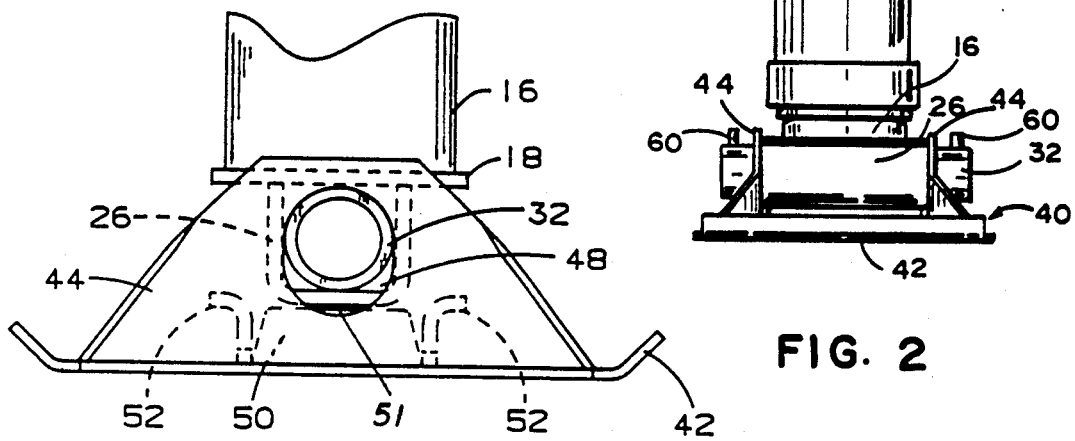
FIG. 8

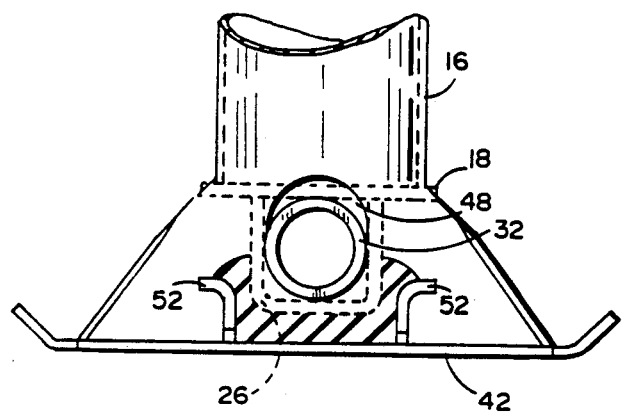
FIG. 3
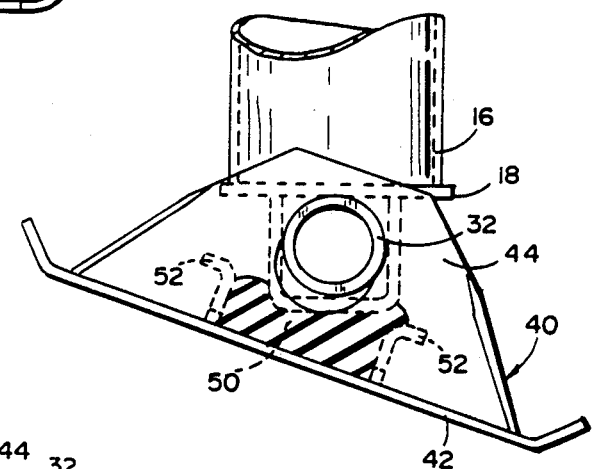
FIG. 4
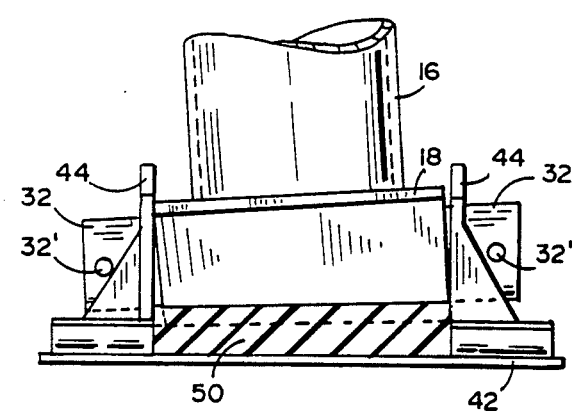
FIG. 5
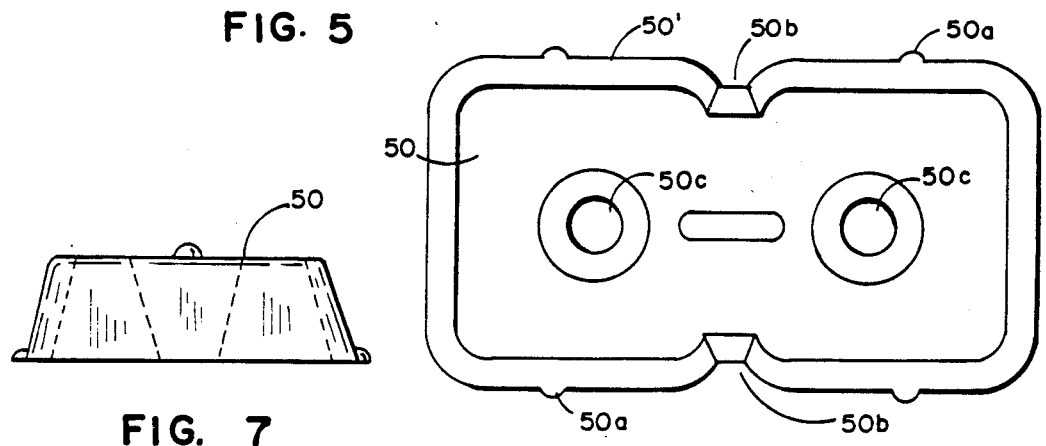
FIG. 7
FIG. 6

TRAILER LANDING GEAR CUSHION FOOT

BACKGROUND OF THE INVENTION

This invention relates to a cushion foot assembly for a trailer landing gear support.

Cushioned feet for landing gears have been generally known for some years. Epstein U.S. Pat. No. 3,219,362 proposed the use of resilient blocks between upper and lower plates that were bolted together. The upper plate was bolted to a frustum welded on the lower end of the landing gear leg. Dalton et al U.S. Pat. No. 3,666,190 inserted a resilient toroid between the leg and the foot, the latter being crimped onto or bolted onto the leg. Dreyer et al U.S. Pat. No. 4,462,612 retained the foot with crimping onto the leg portion, holding an elastic pressure body in place. Ringe U.S. Pat. No. 4,634,144 crimped the foot over the leg to retain a wedge-shaped resilient member. Baxter U.S. Pat. No. 4,824,136 bolted the foot to the leg, with a resilient pad enclosed therebetween. It will be noted that all of these except the Epstein proposal enclose the pad so that it is not visible to evaluate its condition or potential replacement. Most of them, moreover, do not have the foot readily removable from the leg for replacement in case of damage to the foot. Such damage can readily occur, for example, if the trailer supported on a landing gear shifts, or the landing gear foot is lowered onto an uneven surface as on a rock, or a partially elevated foot strikes something during movement of the trailer. The typical marketed landing gear foot of the padded type has a fore-to-aft articulation of about five degrees, and a side-to-side articulation of about five degrees, such that placement on an uneven surface more than this angle can readily damage the foot and/or leg structure under the heavy load of the trailer. Replacement of deteriorated rubber pads is a problem with these prior units as can be readily envisioned. Rubber pads do deteriorate as by entry of mud, dirt, etc. into the housing, and by aging of the rubber, so that they should be periodically replaced. Damage to the foot also calls for replacement. Removal of the foot too often requires use of a cutting torch, followed by the problem of mounting another foot on the leg or alternatively replacement of the entire leg. These actions require specially trained repairmen. While the foot of the support in U.S. Pat. No. 4,634,144 can be removed for replacement, it only fits on the special leg as there shown.

SUMMARY OF THE INVENTION

An object of this invention is to provide an effective cushioned landing gear foot which allows ready visibility of the resilient cushion to enable evaluation of the condition thereof, and which enables the foot to be readily removed for replacement of the rubber cushion or to substitute another foot in the event of damage to the existing one. The replacement can be made without having to use a cutting torch, but simply by knocking out a clinch pin in the suspension axle. The housing for the axle is below the leg and also serves as an abutment to engage the cushion.

The foot is attached to the leg by a tubular suspension axle which is arranged such that it does not have any initial compression load applied to it when the landing gear is lowered to support a trailer. The lower end of the leg has an abutment member which engages the resilient pad under compression load. The member has a rectangular cross section including a flat bottom surface for abutting the pad. The pad has sufficient clearance with respect to a pair of fore-and-aft inverted L-shaped retaining walls to allow an approximately 20 degree fore-and-aft articulation of the foot on the leg, and an approximately five degree side-to-side articulation. The clearance between this flat surface (in elevated condition) and the resilient pad is less than the potential vertical movement of the hollow suspension axle in a pair of slots into which it extends, so that when the landing gear is lowered, the abutment member first engage the pad and compresses it without the suspension axle being put into compressive load. When the resilient pad is resiliently distorted under a load on the assembly approaching a predetermined partial load, preferably about 15,000 to 20,000 pounds, the axle begins to bear some load. When the load on the pad exceeds a predetermined maximum, preferably no more than about 25,000 pounds, the axle bears all of the excess load.

BRIEF DESCRIPTION OF THE DRAWINGS

FIG. 1 is a side elevational view of a landing gear assembly employing the invention;

FIG. 2 is a rear elevational view of one of the landing gear leg and foot assemblies of the landing gear mechanism;

FIG. 3 is an enlarged side elevational view of the novel components at the lower end of the landing gear leg and cooperative foot of this invention;

FIG. 4 is a side elevational view of the components in FIG. 3 showing the fore-to-aft articulation range;

FIG. 5 is a rear elevational view of the components in FIGS. 3 and 4, showing side-to-side articulation;

FIG. 6 is a plan view of the resilient compressible cushion or pad of this invention;

FIG. 7 is an end elevational view of the cushion in FIG. 6; and

FIG. 8 is an enlarged, end elevational view of the leg and foot assembly with the foot suspended and not under load.

DESCRIPTION OF THE PREFERRED EMBODIMENT

Referring now specifically to the drawings, the landing gear assembly 10 typically comprises a pair of like landing gear legs, a gear box adjacent one of these legs, an input drive shaft to the gear box for engagement with a hand crank, and a cross shaft to the second leg. The combination will be described herein relative to one leg assembly, it being understood that the novel features on the second leg assembly are identical.

More specifically, referring to the drawings, the single leg assembly 12 of the landing gear assembly 10 is shown to include a telescopic leg employing an upper outer tubular leg member 14 and a lower inner tubular leg member 16. Each leg assembly is extendable and contractible by a screw mechanism comparable to that, for example, set forth in U.S. Pat. No. 3,518,890, such that when the telescopic leg is vertically extended, it can support a trailer on the foot mechanism, and when retracted upwardly can be suspended beneath a semi-trailer or the like. Operation of the screw mechanism is through a conventional gear box 20 actuated as by a crank (not shown) through an input shaft 22. An output shaft 26 can connect to a cross shaft (not shown) to the second leg (not shown) in conventional fashion.

The lower outer end of inner tubular leg 16 has a plate 18 affixed thereto as by welding. Beneath this plate and welded thereto is a horizontally oriented, (FIGS. 1 and 2) tubular abutment member 26 elongated transversely relative to the vehicle direction of movement. As shown, it is rectangular in cross sectional configuration, preferably square. It has an inner width and height just larger than the outer diameter of the axle it receives, and a length less than that of the axle, so that the axle ends protrude therefrom. This hollow abutment member also serves as a housing for an elongated tubular axle 32 extending through the abutment housing. Suspended from the ends of axle 32 is a foot subassembly 40.

This foot subassembly 40 includes a ground engaging base plate 42 having a pair of spaced side flanges 44 extending upwardly therefrom and made integral therewith as by welding. The lower ends of plates 44 preferably extend outwardly diagonally, as shown, for reinforcement. These side plates 44 have horizontally aligned orifices, each of vertical slot-type configuration. The width of the orifices is slightly larger than the outer diameter of axle 32 and the height considerably greater than the diameter of axle 32 to allow vertical "play" movement of this axle. When the foot is suspended by an elevated leg, the dimension by which these orifices 48 is vertically longer than the diameter of axle 32 is significantly greater than the vertical clearance 51 between the lower abutment surface of abutment housing 26 and the top of the underlying resilient pad 50 to be described. This is for purposes hereinafter noted. The bottom surface of abutment housing 26 is flat, the corner portions being radiused as depicted in FIGS. 3 and 4. When the landing gear leg is elevated, shoe 40 is suspended on axle 32 via side plates 44, the axle resting against the inside bottom surface of abutment housing 26.

Side plates 44 form two parallel walls of a pocket at the upper surface of base plate 42 of foot 40. The fore-and-aft walls of this pocket are defined by a pair of inverted L-shaped plates 52 of a height preferably somewhat greater than the height of resilient pad 50. The upper outwardly extending flanges of these inverted L-shaped plates have been found highly effective in providing the strength necessary to resist deformation thereof when the resilient pad is under compression due to the weight of a loaded trailer. Specifically, the structure can accommodate a load even up to 100,000 pounds, although using a hollow housing. This is in contrast to prior landing gear devices.

Resilient cushion 50 has an at rest configuration basically like that depicted in FIGS. 6 and 7. More specifically, it comprises a generally rectangular rubber member approximately twice as long in its transverse dimension, i.e., crosswise of the trailer to be supported, than in its fore-to-aft dimension. The side walls 50' are tapered upwardly inwardly, especially at the front and rear walls thereof. The resilient pad is retained in its pocket by a friction fit achieved with four small protrusions 50a extending forwardly and rearwardly, to be deformed when the pad is pressed into position. Preferably, the front and rear walls of the pad also have central notches 50b, and there is a tapered orifice 50c in the center of both ends thereof. The tapered walls 50', notches 50b and tapered orifices 50c enable temporary rubber position transfer laterally when the unit is under vertical load.

Axle 32 is held in abutment housing 26 by locking pins 60 extending through orifices 32' through the opposite ends of the axle extending beyond the ends of housing 26. Drain holes in the foot at the bottom of the pad allow water to drain out of the pocket.

When the telescopic leg is vertically extended and put under load, this load is not initially applied to axle 32 since the clearance 51 between the bottom surface of abutment housing 26 and the top of pad 50 is significantly less than the clearance between the outer diameter of axle 32 and the top of slot orifices 48. Application of the full load to abutment 26 causes it to depress into the resilient pad, forcing portions of the rubber pad laterally outwardly into the clearances fore-and-aft of abutment 26, i.e., between it and fore-and-aft support walls 52 (FIG. 3). This condition is shown somewhat exaggerated in FIG. 3. As load is progressively increased on the assembly, by cranking down of the inner leg and the attached foot, some of the load begins to be applied to axle 32 because the pad is then sufficiently deformed to cause axle 32 to approach the bottom ends of slots 48. This preferably begins to occur when the load applied is a predetermined amount preferably in the amount of about 15,000 to 20,000 pounds applied to each leg, i.e., 30,000 to 40,000 pounds on both legs. As the load exceeds about 25,000 pounds per leg, the axle bears all of the excess load above the predetermined maximum load, i.e., preferably about the 25,000 pound amount, with the resilient pad still bearing the remaining 25,000 pound load, but no more. This controlled loading is achieved by selecting the difference between the clearance of abutment 26 from the top of pad 50, and axle 32 from the bottom of slots 48.

It has been found that the polygonal configuration of the abutment housing, particularly the square cross sectional configuration as illustrated, resists deformation under the inward pressure of the resilient material against the walls thereof under load conditions better than a cylindrical housing of circular cross sectional configuration. In the illustrated embodiment, the distance front to rear between the inner surfaces of fore-and-aft support walls 52 is three inches, while the front to rear outer dimension of housing abutment 26 is two and one-half inches, thereby leaving approximately a one-quarter inch clearance at the front and at the rear. Further, the taper on the edges of the one inch thick pad is approximately one-quarter inch across on each of the front and rear sides thereof. The wall taper is offset, therefore, about 25 percent of the pad height, for an angle of taper of about $22\frac{1}{2}$ degrees. These combined features enable up to about 20 degrees articulation fore-to-aft of the foot relative to the leg as depicted in FIG. 4. Yet the structure has fully adequate support in such condition for heavy loads. The rubber pad is preferably an SBR (styrene-butadiene copolymer), such as SAE J200 5AA 725A13B13F17. Other suitable resilient elastic materials, preferably rubber, can be employed, such as GR-S or Buna-S. The side clearance between the ends of abutment housing 26 and side plates 44 is relatively small, permitting articulation side-to-side of up to about five degrees.

The exposed rubber cushion can be readily visually observed to determine its condition. If the resilient member deteriorates and/or the foot of the structure is damaged, the foot can be quickly removed for replacement of the pad and/or replacement of the entire foot subassembly. More specifically, one or both clinch pins 60 extending through orifices 32' (FIG. 5) in the ends of axle 32 can be driven out as by a punch, allowing axle 32 to be removed, thereby dropping foot subassembly 40 from the leg for replacement of the pad and/or foot. The new one is installed simply by inserting the axle back into position and driving in a new locking pin.

Those in the art, upon studying this disclosure and the detailed description of the preferred embodiment, will likely envision variations within the concept presented. Thus, the invention is intended to be limited only by the appended claims and the reasonable equivalents to that defined therein.

The embodiments of the invention in which an exclusive property or privilege is claimed are defined as follows:

1. A landing gear assembly comprising:
   a telescopic leg vertically extendable and contractible, for supporting a trailer when extended and being suspended when contracted;
   a foot;
   said foot having spaced vertical suspension plates with aligned orifices therein;
   a horizontal suspension axle through said orifices, for supporting excess load, and also for suspending said foot;
   a hollow, horizontally oriented, load support abutment on said leg;
   said abutment extending around said axle to form a housing therefore;
   said axle having ends extending out of said hollow load support abutment;
   said axle, abutment and orifices allowing said foot to pivot relative to said leg;
   an upper pocket in said foot;
   a resilient compressible pad in said pocket;
   said abutment being movable from a conditions engaging said pad when said leg and foot are under compressive load, to a condition disengaged from said pad with clearance therebetween when said foot is suspended beneath said leg and not under load.

2. The landing gear assembly in claim 1 wherein said abutment is a tubular member of polygonal cross sectional configuration.

3. The landing gear assembly in claim 1 wherein said abutment has a flat bottom surface for engaging said pad.

4. The landing gear assembly in claim 1 wherein said abutment is of rectangular cross section.

5. The landing gear assembly in claim 1 wherein said abutment is of square cross section.

6. The landing gear assembly in claim 1 wherein said pocket has inverted L-shaped outwardly extending fore-and-aft retention walls.

7. The landing gear assembly in claim 1 wherein said orifices are vertically elongated slots enabling axle movement greater than the clearance between the disengaged abutment and pad.

8. The landing gear assembly in claim 1 wherein said pad has upwardly inwardly tapered fore-and-aft walls.

9. The landing gear assembly in claim 6 including a clearance between said abutment and said pocket retention walls sufficient to allow approximately 20 degrees fore-to-aft articulation of the foot relative to the leg when under compressive load.

10. The landing gear assembly in claim 8 wherein said pad has upwardly, inwardly tapered side walls and central notches for temporary resilient material transfer under load.

11. The landing gear assembly in claim 1 wherein said pad is visible from the exterior of the assembly for determining the condition thereof.

12. The landing gear assembly in claim 11 wherein said pad has a fiction fit in said pocket.

13. The landing gear assembly in claim 1 wherein said aligned orifices are vertical slots allowing said axle to have a certain amount of vertical movement therein, and said certain amount is greater than said clearance, whereby said pad will take initial load on said assembly.

14. The landing gear assembly in claim 13 wherein said certain amount is just sufficiently greater than said clearance that, after said pad has a predetermined maximum load applied thereto, loads exceeding said predetermined maximum load will be applied to said axle.

15. The landing gear assembly in claim 14 wherein said abutment is a tubular member of polygonal cross sectional configuration.

16. The landing gear assembly in claim 15 wherein said abutment is of rectangular cross section.

17. The landing gear assembly in claim 16 wherein said pocket has inverted L-shaped fore-and-aft retention walls; and
   said pad has upwardly inwardly tapered fore-and-aft walls.

18. The landing gear assembly in claim 17 including a clearance between said abutment and said pocket retention walls sufficient to allow approximately 20 degrees fore-to-aft articulation of the foot relative to the leg when under compressive load; and
   said foot has approximately five degrees side-to-side articulation under compressive load.

19. A landing gear assembly comprising:
   a telescopic leg vertically extendable and contractible, for supporting a trailer when extended and being suspended when contracted;
   a foot;
   said foot having spaced vertical suspension plates with aligned vertically extended slot type orifices therein;
   a horizontal suspension axle through said orifices, for supporting excess load, and also for suspending said foot;
   a hollow, horizontally oriented, load support abutment housing on said leg;
   said abutment housing having a polygonal cross sectional configuration and extending around said axle;
   said axle having ends extending out of said abutment housing;
   said axle, abutment and orifices allowing said foot to pivot relative to said leg and said slot type orifices allowing said axle to move vertically thereon;
   an upper pocket in said foot;
   a resilient compressible pad in said pocket;
   said abutment being spaced from said pad to form a clearance therebetween when said foot is suspended from said leg and not under load;
   said axle being movable in said slot type orifices an amount significantly greater than said clearance between said abutment and said pad, with said abutment being movable from a condition engaging and temporarily distorting said pad when said leg and foot are under compressive load, to a condition disengaged from said pad with clearance therebetween when said foot is suspended beneath said leg and not under load.

20. The landing gear assembly in claim 19 wherein said abutment is of rectangular cross section.

21. The landing gear assembly in claim 20 wherein said abutment is of square cross section.

22. The landing gear assembly in claim 19 wherein said axle is tubular.

23. The landing gear assembly in claim 22 wherein said pad has a friction fit in said pocket.

24. The landing gear assembly in claim 19 wherein said abutment is a tubular member of polygonal cross sectional configuration.

25. The landing gear assembly in claim 19 wherein said abutment has a flat bottom surface for engaging said pad.

26. The landing gear assembly in claim 19 wherein said pocket has inverted L-shaped, outwardly extending, fore-and-aft retention walls.

27. The landing gear in claim 19 wherein said suspension axle is contained in orifices which are vertically elongated slots enabling vertical axle movement significantly greater than the clearance between the disengaged abutment and pad to prevent load being applied to said axle when said assembly is under initial compression load to a predetermined amount, and to cause load over said predetermined amount to be applied to said axle.

28. The landing gear assembly in claim 19 wherein said pad has upwardly inwardly tapered fore-and-aft walls.

29. The landing gear assembly in claim 26 wherein said abutment has sufficient clearance relative to said retention walls to allow approximately 20 degrees fore-to-aft articulation of the foot relative to the leg about said suspension axle when under compression load.

30. The landing gear assembly in claim 29 wherein said foot has approximately five degrees side-to-side articulation under compression load.

31. A landing gear assembly comprising:
a telescopic leg;
a foot;
a suspension axle suspending said foot from said leg in a manner allowing vertical movement therebetween;
a load support abutment in the form of a horizontally oriented housing around said suspension axle;
a resilient pad beneath said abutment and engageable to be depressed by said abutment when said assembly is under initial compressive load; and
means for limiting the maximum load applied to said pad through said axle.

32. The landing gear assembly in claim 31 wherein the potential amount of said vertical movement is significantly greater than the abutment movement causing depression of said resilient pad.

33. The landing gear assembly in claim 32 wherein said resilient pad is on said foot and said abutment is on said leg.

34. The landing gear assembly in claim 33 wherein said foot has a pocket retaining said resilient pad, and said pocket has fore-and-aft walls with clearance relative to said abutment to allow substantial fore-and-aft articulation between said foot and said leg.

35. The landing gear assembly in claim 31 wherein said abutment has a rectangular cross section.

36. The landing gear assembly in claim 33 wherein said suspension axle fits into vertically elongated slots to allow said vertical movement.

37. The landing gear assembly in claim 31 wherein said means causes load amounts exceeding said maximum load to be applied to said axle.

38. The landing gear assembly in claim 37 including vertical plates on said foot having a pair of vertical slots receiving the ends of said axle for vertical movement of said axle in said slots;
said abutment being spaced from said pad; and
wherein said means comprises the relative spacing of said abutment rom said pad compared to a larger potential movement of said axle in said slots.

* * * * *

UNITED STATES PATENT AND TRADEMARK OFFICE
CERTIFICATE OF CORRECTION

PATENT NO. : 5,054,805
DATED : October 8, 1991
INVENTOR(S) : Gerald W. Hungerink et al.

It is certified that error appears in the above-identified patent and that said Letters Patent is hereby corrected as shown below:

Column 2, line 11:

"engage" should be --engages--

Column 4, line 32:

After "clearance" insert --51--

Column 5, claim 1, line 35:

"conditions" should be --condition--

Column 8, claim 38, line 38:

"rom" should be --from--

Signed and Sealed this

Fourth Day of May, 1993

Attest:

MICHAEL K. KIRK

Attesting Officer

Acting Commissioner of Patents and Trademarks